(12) United States Patent
Liu et al.

(10) Patent No.: US 9,537,320 B2
(45) Date of Patent: Jan. 3, 2017

(54) COMMUNICATION POWER WITH MULTI-ENERGY-SOURCE SUPPLY AND CONTROL METHOD

(75) Inventors: Mingming Liu, Shenzhen (CN); Yanni Meng, Shenzhen (CN); Lingqiao Teng, Shenzhen (CN); Baohang Zhou, Shenzhen (CN); Shuwang Wei, Shenzhen (CN)

(73) Assignee: ZTE CORPORATION, Shenzhen, Guangdong (CN)

( * ) Notice: Subject to any disclaimer, the term of this patent is extended or adjusted under 35 U.S.C. 154(b) by 598 days.

(21) Appl. No.: 13/982,256

(22) PCT Filed: Sep. 1, 2011

(86) PCT No.: PCT/CN2011/079239
§ 371 (c)(1),
(2), (4) Date: Jul. 26, 2013

(87) PCT Pub. No.: WO2012/100538
PCT Pub. Date: Aug. 2, 2012

(65) Prior Publication Data
US 2013/0313908 A1    Nov. 28, 2013

(30) Foreign Application Priority Data
Jan. 27, 2011    (CN) .......................... 2011 1 0030046

(51) Int. Cl.
*G06F 1/26* (2006.01)
*H02J 4/00* (2006.01)
(Continued)

(52) U.S. Cl.
CPC .. *H02J 4/00* (2013.01); *H02J 1/10* (2013.01); *H02J 1/102* (2013.01); *H02J 3/381* (2013.01);
(Continued)

(58) Field of Classification Search
CPC ....................................................... G06F 1/26
(Continued)

(56) References Cited

U.S. PATENT DOCUMENTS

2011/0125336 A1* 5/2011 Groves .................. F03D 9/002
700/287
2013/0249298 A1  9/2013 Dong

FOREIGN PATENT DOCUMENTS

CN        101286655 A     10/2008
CN        101436785 A      5/2009
(Continued)

OTHER PUBLICATIONS

International Search Report in international application No. PCT/CN2011/079239, mailed on Dec. 8, 2011.
(Continued)

*Primary Examiner* — Rexford Barnie
*Assistant Examiner* — Joseph Inge
(74) *Attorney, Agent, or Firm* — Oppedahl Patent Law Firm LLC

(57) ABSTRACT

The present disclosure discloses a communication power with multi-energy-source supply and a control method. The communication power includes: an inputting unit (21), configured to receive at least two kinds of electrical energy and provide the at least two kinds of electrical energy to an allocating unit (22); the allocating unit (22), configured to allocate at least one kind of electrical energy of the at least two kinds of electrical energy determined by a monitoring unit (25) to a power converting unit (23) according to the control of the monitoring unit (25); the power converting unit (23), configured to perform power conversion on the at least one kind of electrical energy allocated by the allocating unit (22), and then provide the converted power to an outputting unit (24); the outputting unit (24), configured to
(Continued)

supply power to an external load; and the monitoring unit (25). With the present disclosure, the modules for input allocating, power converting, etc. for different energy sources may be shared, and overall management may be achieved for multiple energy sources.

5 Claims, 3 Drawing Sheets

(51) Int. Cl.
*H02J 1/10* (2006.01)
*H02J 3/38* (2006.01)

(52) U.S. Cl.
CPC ............... *H02J 3/383* (2013.01); *H02J 3/386* (2013.01); *Y02E 10/563* (2013.01); *Y02E 10/763* (2013.01); *Y10T 307/658* (2015.04)

(58) Field of Classification Search
USPC .......................................................... 307/72
See application file for complete search history.

(56) References Cited

FOREIGN PATENT DOCUMENTS

| CN | 101673955 A | 3/2010 | |
|----|-------------|--------|---|
| CN | 201563002 U | 8/2010 | |
| CN | 101938225 A | 1/2011 | |
| CN | 101951014 A * | 1/2011 | .............. H02J 3/005 |
| CN | 102044989 A | 5/2011 | |
| GB | 2417378 A | 2/2006 | |
| JP | 2003246586 A | 9/2003 | |
| WO | 2009141651 A2 | 11/2009 | |
| WO | 2010134855 A1 | 11/2010 | |

OTHER PUBLICATIONS

English Translation of the Written Opinion of the International Search Authority in international application No. PCT/CN2011/079239, mailed on Dec. 8, 2011.
Supplementary European Search Report in European application No. 11856994.6, mailed on Aug. 6, 2015.

* cited by examiner

—Prior Art—

COMMUNICATION POWER WITH MULTI-ENERGY-SOURCE SUPPLY AND CONTROL METHOD

TECHNICAL FIELD

The disclosure relates to the field of communication technology, and in particular to a communication power with multi-energy-source supply and a control method.

BACKGROUND

A communication power plays a very important role in a communication equipment: electrical energy generated by an electrical generator arrives at a user-side via long-distance transmission by a high-voltage transmission line, and then is converted into AC electrical energy with a voltage level of 110V or 220V through progressive voltage reduction. However, a voltage required by the communication equipment is generally three DC voltage levels of 24V, 48V, or 60V, therefore the communication power is responsible for converting the AC electrical energy with a voltage level of 110V or 220V into DC electrical energy with voltage levels of 24V, 48V, or 60V so as to be used by the communication equipment.

At present, it has become an important subject of the world today to seek a clean and renewable energy source, as a communication infrastructure construction commonly faces problems such as lack of AC electrical energy supply, high cost for operation and maintenance of diesel engine power generation, unstable supply of a conventional mineral energy source in areas such as a desert, a Gobi, an island, and the like. With the continuous maturing of techniques for applying the renewable energy source such as wind energy, and solar energy, there are more and more communication power products with multi-energy-source supply. A supply solution simultaneously supporting multiple energy sources such as wind energy, solar energy, AC electrical energy, a diesel generator as well as a backup storage battery is in the ascendant in an communication power industry. A structure of these communication powers is in general as shown in FIG. 1, for example, electrical energy generated by a wind power generating equipment is input to a corresponding wind energy power converting module, electrical energy generated by a solar energy collecting equipment such as a solar panel is input to a corresponding solar energy power converting module, electrical energy generated by a diesel engine generator is input to a corresponding diesel engine power converting module, and then each of the power converting modules provides the power converted electrical energy to an energy source outputting module. Since a voltage-input range differs for electrical energy generated by different energy sources, such communication powers require different power converting modules to perform power conversion while supplying power.

It can thus be seen that the prior art mainly has the following defects: the modules for input allocating, power converting, etc. for different energy sources cannot be shared, and overall management cannot be achieved for multiple energy sources.

SUMMARY

The present disclosure provides a communication power with multi-energy-source supply and a control method to solve the problem in the prior art that the modules for input allocating, power converting, etc. for different energy sources cannot be shared, and overall management cannot be achieved for multiple energy sources.

A communication power with multi-energy-source supply, includes: an inputting unit, an allocating unit, a power converting unit, an outputting unit, and a monitoring unit, wherein the inputting unit is configured to receive at least two kinds of electrical energy, and provide the at least two kinds of electrical energy to the allocating unit;

the allocating unit is configured to allocate at least one kind of electrical energy of the at least two kinds of electrical energy determined by the monitoring unit to the power converting unit according to the control of the monitoring unit; and the power converting unit is configured to perform power conversion on the at least one kind of electrical energy allocated by the allocating unit, and then provide the converted electrical energy to the outputting unit which then supplies power to an external load.

Further, the inputting unit may be further configured to perform signal conditioning respectively on each kind of electrical energy received according to a voltage-input range of the power converting unit.

Further, the monitoring unit may be configured to: acquire an intensity of each kind of electrical energy input by the inputting unit and a load current required by the external load of the outputting unit;

determine a kind or kinds of electrical energy that can provide the required load current in the at least two kinds of electrical energy according to the intensity of each kind of electrical energy and the load current; and determine at least one kind of electrical energy from the electrical energy that can provide the required load current, and the determined at least one kind of electrical energy is allocated to the power converting unit by the allocating unit.

Further, the monitoring unit may also be configured to: acquire a pre-determined priority of each kind of electrical energy, and determine the at least one kind of electrical energy from the electrical energy that can provide the required load current according to the order of the priority.

Further, the power converting unit may include a plurality of power converting sub-modules powered by the same kind of or different kinds of electrical energy.

Further the communication power may further include: a storage battery connected with the outputting unit and configured to perform charging or discharging according to the control of the monitoring unit.

A control method for multi-energy-source supply, includes:

receiving at least two kinds of electrical energy, and selecting at least one kind of electrical energy from the at least two kinds of electrical energy; and performing power conversion on the at least one kind of electrical energy, and then providing the converted electrical energy to an external load.

Further, the selecting at least one kind of electrical energy from the at least two kinds of electrical energy may specifically include:

acquiring an intensity of each kind of electrical energy and a load current required by the external load;

determining a kind or kinds of electrical energy that can provide the required load current in the at least two kinds of electrical energy according to the intensity of each kind of electrical energy and the load current; and selecting at least one kind of electrical energy from the electrical energy that can provide the required load current.

The control method may further include: after receiving at least two kinds of electrical energy, performing signal conditioning respectively on each kind of electrical energy received.

Further, the selecting at least one kind of electrical energy from the electrical energy that can provide the required load current may specifically include: acquiring a pre-determined priority of each kind of electrical energy, and selecting the at least one kind of electrical energy from the electrical energy that can provide the required load current according to the order of the priority.

By adopting unified inputting unit and power converting unit, and via the control of the monitoring unit in embodiments of the present disclosure, the modules for input allocating, power converting, etc. for different energy sources may be shared, and overall management may be achieved for multiple energy sources.

DETAILED DESCRIPTION

An embodiment of the present disclosure provides a communication power with multi-energy-source supply and a control method to solve the problems in the prior art that the modules for input allocating, power converting, etc. for different energy sources cannot be shared, and overall management cannot be achieved for multiple energy sources.

Figure 2:
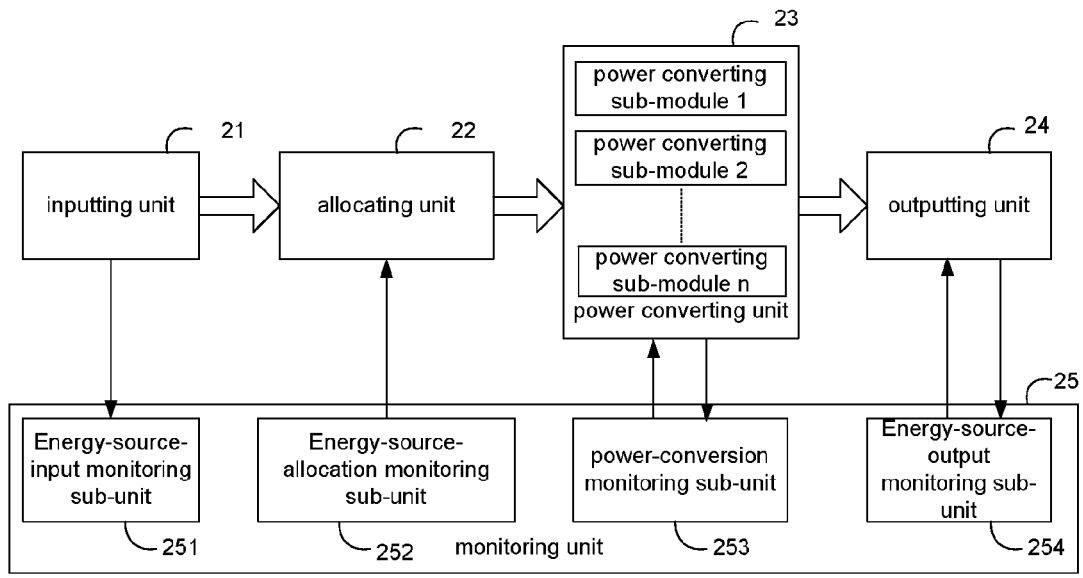
FIG. 2 is a schematic view of the structure of a communication power with multi-energy-source supply in an embodiment of the present disclosure.

An embodiment of the present disclosure provides a communication power with multi-energy-source supply, as shown in FIG. 2, including: an inputting unit 21, an allocating unit 22, a power converting unit 23, an outputting unit 24, and a monitoring unit 25, wherein, the inputting unit 21 is configured to receive at least two kinds of electrical energy, and provide the at least two kinds of electrical energy to the allocating unit 22;

the allocating unit 22 is configured to allocate at least one kind of electrical energy of the at least two kinds of electrical energy determined by the monitoring unit 25 to the power converting unit 23 according to the control of the monitoring unit 25; and the power converting unit 23 is configured to perform power conversion on the at least one kind of electrical energy allocated by the allocating unit 22, and then provide the converted electrical energy to the outputting unit 24 which then supplies power to an external load.

By adopting the communication power provided by the embodiment of the present disclosure, the modules for input allocating, power converting, etc. for different energy sources may be shared, and overall management may be achieved for multiple energy sources.

Figure 3:
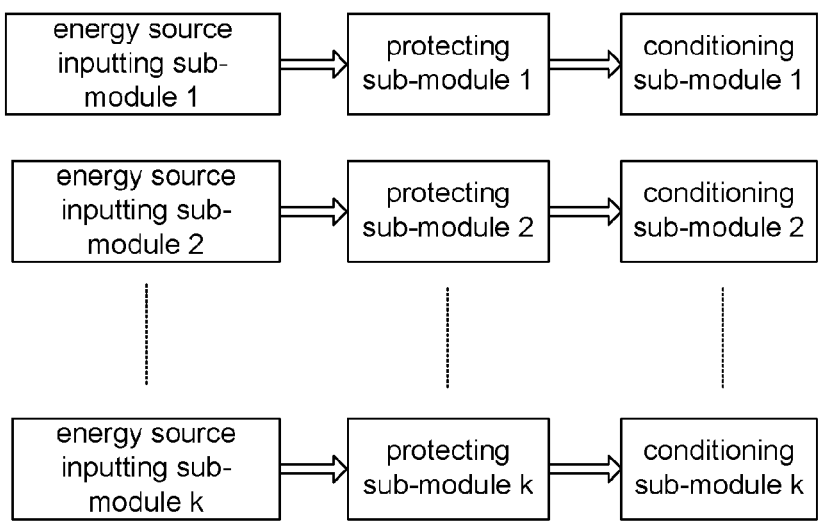
FIG. 3 is a schematic view of the structure of an inputting unit in the communication power with multi-energy-source supply in an embodiment of the present disclosure.

Preferably, the inputting unit 21 is also configured to perform over-current protection and voltage adjustment respectively on each kind of electrical energy received according to a voltage-input range of the power converting unit 23, in which case the specific structure of the inputting unit 21 is as shown in FIG. 3, where the inputting unit 21 performs signal conditioning on each kind of input electrical energy to make it conform to the requirement on the input electrical energy of a power converting module, and outputs the conditioned electrical energy to the power converting module, wherein the signal conditioning mainly includes protecting and conditioning, in which the protecting mainly includes over-voltage protection, under-voltage protection as well as over-current protection, etc., and the conditioning mainly includes frequency adjustment, voltage adjustment, etc.

Preferably, the monitoring unit 25 is configured to acquire an intensity of each kind of electrical energy input by the inputting unit 21 and a load current required by the external load of the outputting unit; determine a kind or kinds of electrical energy that can provide the required load current in the at least two kinds of electrical energy according to the intensity of each kind of electrical energy and the load current; and determine at least one kind of electrical energy from the electrical energy that can provide the required load current, and the determined at least one kind of electrical energy is allocated to the power converting unit 23 by the allocating unit 22. Wherein when determining at least one kind of electrical energy from the electrical energy that can provide the required load current, the monitoring unit 25 may adopt the following way: acquiring a pre-determined priority of each kind of electrical energy, and determining the at least one kind of electrical energy from the electrical energy that can provide the required load current according to the order of the priority.

Preferably, the power converting unit 23 includes a plurality of power converting sub-modules which are powered by the same kind of or different kinds of electrical energy. In a practical application, a preferred way of implementation is that: the power converting unit 23 consists of a plurality of power converting sub-modules of the same specification and model connected in parallel.

Preferably, the communication power also includes: a storage battery connected with the outputting unit 24 and configured to perform charging or discharging according to the control of the monitoring unit 25.

The specific role of each unit in the above communication power are elaborated below:

The inputting unit 21 is configured to complete inputting, protecting and conditioning of different energy sources, and convert a voltage signal, current signal, frequency signal of an input energy source, where after being converted, all of the different energy sources are adapted to a general input range of the power converting unit.

The allocating unit 22 is configure to switch on or switch off a power supplying circuit between each input of the multiple energy sources and each power converting sub-module when instructed by a command of the monitoring unit 25, to achieve prioritized selection of multi-energy-source supply, such that each power converting sub-module may switch on the power supplying input circuit of only one energy source at one selected time point. Of course, it is also possible that no power supplying circuit of any energy source is switched on. With regard to the communication power with multi-energy-source supply, at one selected time point, it is possible that only one energy source supplies power to all of the power converting sub-modules, or that the multiple energy sources simultaneously supply power to different power converting sub-modules, respectively.

The power converting unit 23 consists of a plurality of general power converting sub-modules which convert the input electrical energy into DC electrical energy that conforms to the requirement of the load. The plurality of the power converting sub-modules work in parallel connection, and their output is connected to a common conflux bus bar. Each of the general power converting sub-modules has the same physical, electrical, signal, or software protocol interface.

The outputting unit 24 is configured to achieve load allocation and access of a backup storage battery, and achieve protection of the load and of the storage battery.

The monitoring unit 25 is configured to achieve overall management of energy input and output of the communication power with multi-energy-source supply, coordinate the collaborative work among units, and ensure the reasonable use of the multiple energy sources. The monitoring unit 25 may also be subdivided into the following components according to the functions: energy-source-input monitoring sub-unit 251, energy-source-allocation monitoring sub-unit 252, power-conversion monitoring sub-unit 253, and energy-source-output monitoring sub-unit 254.

Figure 4:
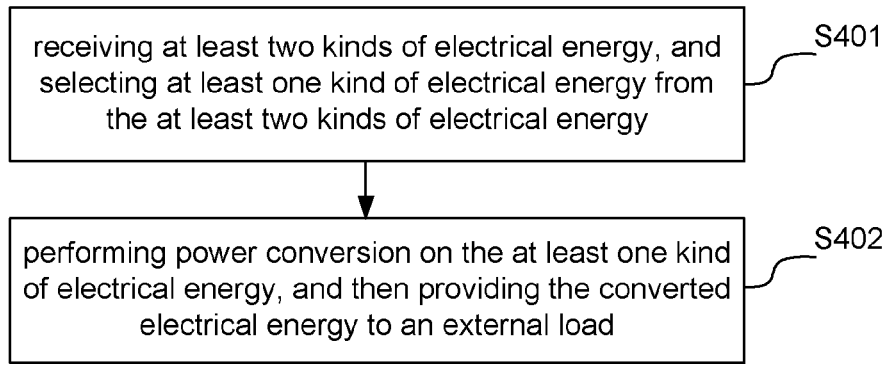
FIG. 4 is a flow chart of a control method for multi-energy-source supply in an embodiment of the present disclosure.

An embodiment of the present disclosure also provides a control method for multi-energy-source supply, as shown in FIG. 4, including the following steps:

S401: receiving at least two kinds of electrical energy, and selecting at least one kind of electrical energy from the at least two kinds of electrical energy.

S402: performing power conversion on the at least one kind of electrical energy, and then providing the converted electrical energy to an external load.

Wherein, the selecting at least one kind of electrical energy from the at least two kinds of electrical energy specifically includes: acquiring an intensity of each kind of electrical energy and a load current required by the external load; determining a kind or kinds of electrical energy that can provide the required load current in the at least two kinds of electrical energy according to the intensity of each kind of electrical energy and the load current; and selecting at least one kind of electrical energy from the electrical energy that can provide the required load current. Moreover, the step of selecting at least one kind of electrical energy from the electrical energy that can provide the required load current may be achieved as follows: a pre-determined priority of each kind of electrical energy is acquired, and the at least one kind of electrical energy is selected from the electrical energy that can provide the required load current according to the order of the priority.

Preferably, after the step of receiving at least two kinds of electrical energy, the method may further include: performing signal conditioning respectively on each kind of electrical energy received, wherein the signal conditioning mainly includes protecting and conditioning, in which the protecting mainly includes over-voltage protection, under-voltage protection as well as over-current protection, etc., and the conditioning mainly includes frequency adjustment, voltage adjustment, etc.

By adopting the communication power provided by the embodiment of the present disclosure, the modules for input allocating, power converting, etc. for different energy sources may be shared, and overall management may be achieved for multiple energy sources.

Figure 5:
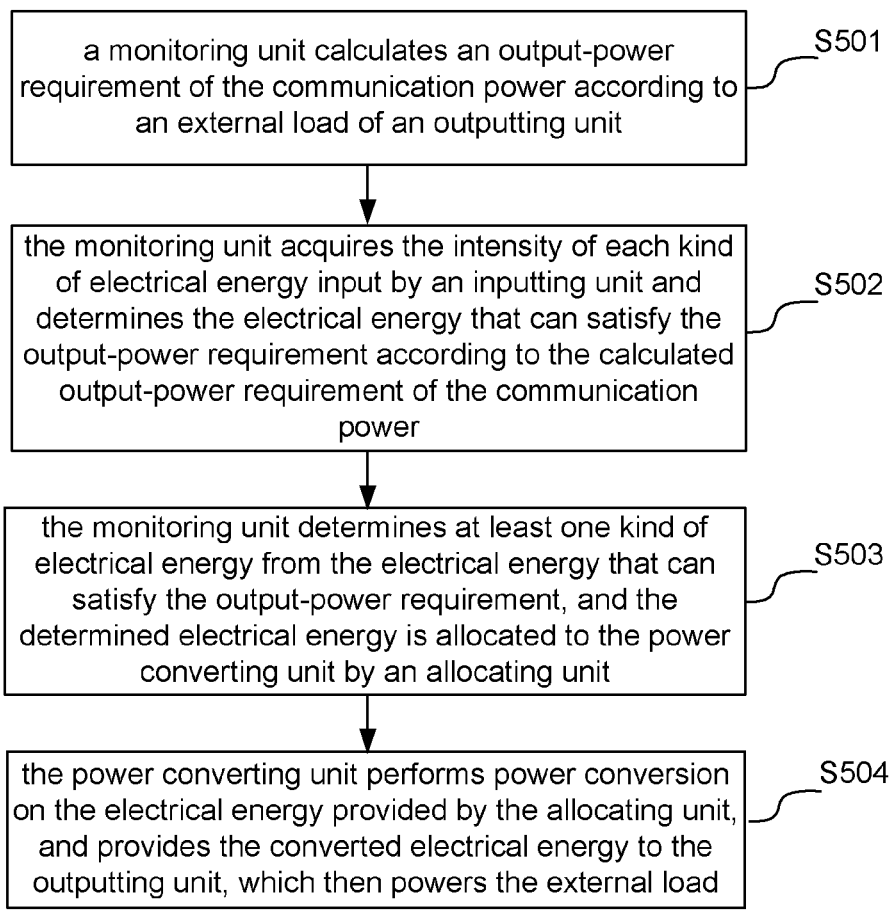
FIG. 5 is a flow chart of a control method for multi-energy-source supply in another embodiment of the present disclosure.

The control method for multi-energy-source supply provided by an embodiment of the present disclosure is introduced in detail in combination with the communication power shown in FIG. 2; As shown in FIG. 5, the control method includes the following steps:

S501: a monitoring unit calculates an output-power requirement of the communication power according to an external load of an outputting unit.

In a specific implementation, a rated output-power requirement may be directly determined by the monitoring unit according to a rated current of the load before or during power supply. Alternatively, the monitoring unit may also acquire in real time during power source a load current output by the outputting unit, and obtain the actual output-power requirement of the communication power according to the load current. Of course, in addition to real-time acquisition, the monitoring unit may also acquire the load current in a regular or irregular way, or the like. Moreover, when the communication power further includes a storage battery, it is also required to calculate a charging current of the storage battery according to a charging and discharging management strategy of the storage battery, thereby obtaining the output-power requirement of the communication power according to the load current and the charging current. For example, assuming that the load current of the communication power is 60 Å, and two sets of storage batteries of 500 AH are configured, the charging current ratio of each set of the storage batteries is 0.1 C, wherein C is a battery capacity. Therefore, when the battery capacity of the two sets of storage batteries is 1000 AH, the maximum charging current is 100 Å when the two sets of storage batteries are charged. As the power converting unit includes a plurality of power converting sub-modules, it is further assumed that a rated output current of each power converting sub-module is 50 Å. In accordance with a configuration principle of the communication power, a redundant configuration is to be performed on the power converting sub-modules in order to simultaneously satisfy power source for the load and charging of the storage battery, and to achieve backup between each of the power converting sub-modules. Therefore, five power converting sub-modules may be configured in the power converting unit of the communication power.

S502: the monitoring unit acquires the intensity of each kind of electrical energy input by an inputting unit and determines the electrical energy that can satisfy the output-power requirement according to the calculated output-power requirement of the communication power.

In a specific implementation, the monitoring unit may acquire the intensity of each kind of electrical energy input by the inputting unit in real time, or may regularly or irregularly acquire the intensity of each kind of electrical energy input by the inputting unit; and determine the electrical energy that can satisfy the output-power requirement according to the intensity of each kind of electrical energy. Here, the output-power requirement may be the rated output-power requirement or the actual output-power requirement.

S503: the monitoring unit determines at least one kind of electrical energy from the electrical energy that can satisfy the output-power requirement, and the determined electrical energy is allocated to the power converting unit by an allocating unit.

Here, if more than one kind of electrical energy can satisfy the output-power requirement, then it is required to perform a selection according to a certain strategy, for example, it is possible to determine at least one kind of electrical energy from the electrical energy that can satisfy the output-power requirement according to the order of a pre-determined priority of each kind of electrical energy. For example, when the input electrical energy of the inputting unit includes: the electrical energy generated by a wind power generating equipment, the electrical energy generated by a solar panel, and the electrical energy generated by a diesel generator; and the priority of the electrical energy generated by the wind power generating equipment is higher than that generated by the solar panel, and the priority of the electrical energy generated by the solar panel is higher than that generated by the diesel generator. Assuming that the power converting unit includes five power converting sub-modules, when the electrical energy generated by the wind power generating equipment is sufficient to satisfy full-load output of the five power converting sub-modules, only the electrical energy generated by the wind power generating equipment is adopted to supply power to the five power converting sub-modules in the power converting unit; When the electrical energy generated by the wind power generating equipment decreases and can satisfy the full-load output of only two power converting sub-modules, the electrical energy generated by the wind power generating equipment is adopted to supply power to the two power converting sub-modules in the power converting unit, while the other three power converting sub-modules are powered with the electrical energy generated by the solar panel; When the electrical energy generated by the solar panel is also insufficient, the energy generated by the diesel generator will be adopted accordingly to supply power. It can thus be seen that a plurality of power converting sub-modules in the power converting unit may be powered with the same kind of electrical energy, or with different kinds of electrical energy, respectively.

S504: the power converting unit performs power conversion on the electrical energy provided by the allocating unit, and provides the converted electrical energy to the outputting unit, which then powers the external load.

Wherein, after performing an necessary power conversion on the input electrical energy, each power converting sub-module provides the converted electrical energy to the outputting unit via a common conflux bus bar; Moreover, each power converting sub-module has the same physical, electrical, signal, or software protocol interface; To this end, when the voltage range of the electrical energy input by the inputting unit does not conform to the input requirement of the power converting unit, necessary voltage adjustment of the input electrical energy is required to be performed by the inputting unit so as to conform to the voltage-input range of the power converting unit.

Control over the multi-energy-source supply is achieved by adopting the above steps, and during power supply, the monitoring unit need to acquire the load current to calculate the current actual output-power requirement, acquire the intensity of each kind of electrical energy input by the inputting unit to determine whether the respective kind of electrical energy can satisfy the current actual power requirement, and control which kind of electrical energy being allocated by the allocating unit according to the result of the determination. Moreover, the monitoring unit may also adjust a working state of the power converting unit as well as of the outputting unit as needed, including, but not limited to, voltage regulating or current limiting; and control the working state of each power converting sub-module in the power converting unit, including, but not limited to, startup, shutdown, and sleep.

Figure 1:
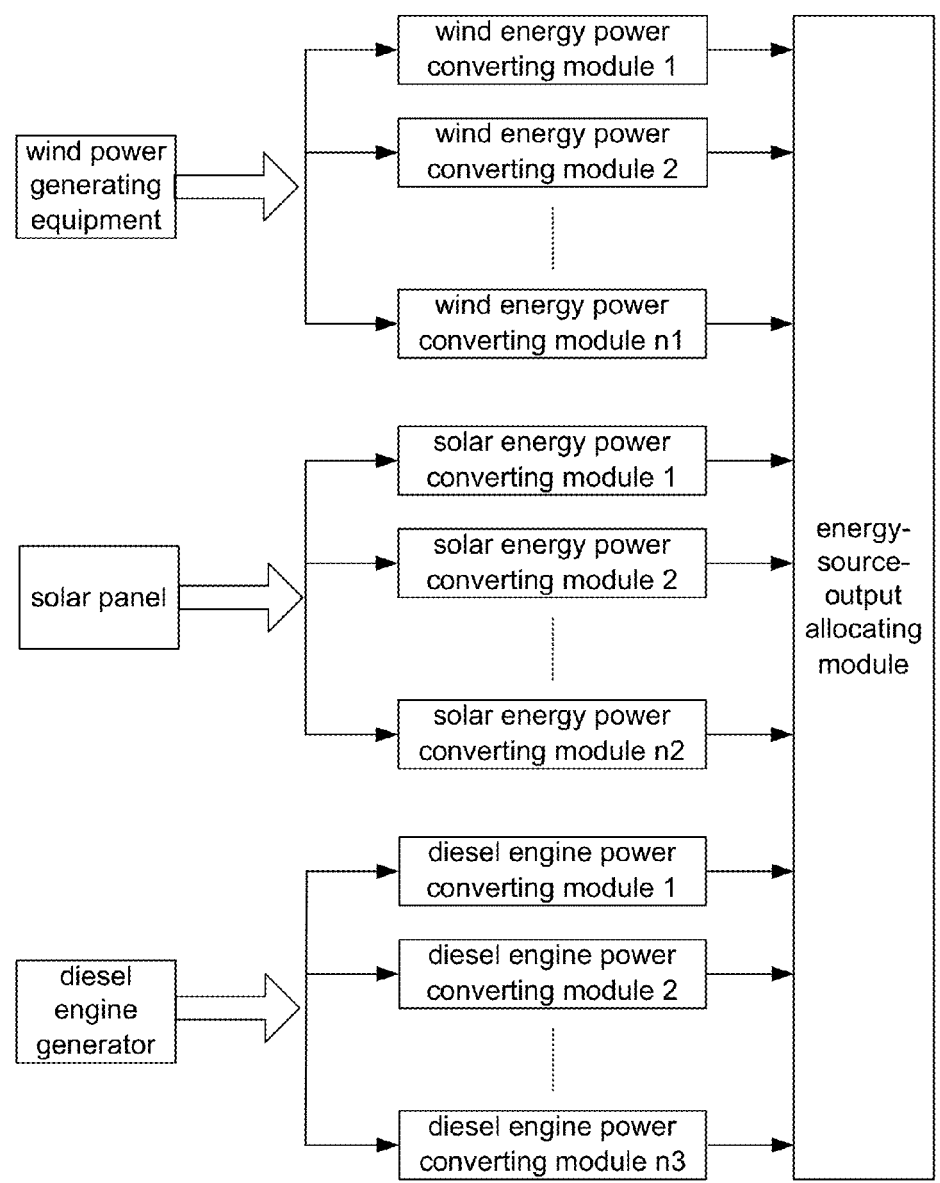
FIG. 1 is a structure of a communication power with multi-energy-source supply in prior art.

By adopting the control method for multi-energy-source supply provided by the embodiments of the present disclosure, the inputting unit performs necessary voltage adjustment of the input electrical energy, such that the input electrical energy conforms to the input-voltage range of the power converting unit, thereby enabling the electrical energy generated by multiple energy sources to share the same power converting unit, thus saving a hardware equipment. For example, in an implementation mode of the prior art, as shown in FIG. 1, each energy source must have several corresponding power converting sub-modules, and the power converting sub-modules corresponding to different energy sources cannot be shared or backed up by each other; While in the present disclosure, the power converting sub-modules corresponding to different energy sources may be shared and may be backed up by each other, thereby reducing hardware cost of the power converting sub-modules and achieving backup of the power converting sub-modules. Moreover, the monitoring unit in the present disclosure may combine the load current, the intensity of each electrical energy, and the priority of each electrical energy to select suitable electrical energy to supply power to the load; In a specific implementation, a renewable energy source such as the clean wind energy, solar energy, etc. may be used preferentially; AC electricity generated by the diesel generator is then used when the renewable energy source is insufficient: and the storage battery may also be used to supply power, thereby achieving overall management of multiple energy sources and enhancing flexibility in energy source allocation.

Apparently, those skilled in the art may perform various modifications and variations on the present disclosure without departing from the spirit and scope of the present disclosure. Thus, if the various modifications and variations of the present disclosure fall within the scope of the claims of the present disclosure as well as the equivalents, then the present disclosure also intends to contain these modifications and variations.

The invention claimed is:

1. A communication power with multi-energy-source supply, comprising: an inputting unit, an allocating unit, a power converting unit, an outputting unit, and a monitoring unit, wherein the inputting unit is configured to receive at least two kinds of electrical energy, and provide the at least two kinds of electrical energy to the allocating unit;

the allocating unit is configured to allocate at least one kind of electrical energy of the at least two kinds of electrical energy determined by the monitoring unit to the power converting unit according to the control of the monitoring unit; and the power converting unit is configured to perform power conversion on the at least one kind of electrical energy allocated by the allocating unit, and then provide the converted electrical energy to the outputting unit which then supplies power to an external load, wherein the inputting unit is further configured to perform signal conditioning respectively on each kind of electrical energy received according to a voltage-input range of the power converting unit, to conform to the voltage-input range of the power converting unit, wherein the power converting unit consists of a plurality of general power converting sub-modules working in parallel connection outputting to a common conflux bus bar: each of the general power converting sub-modules has the same physical, electrical, signal, or software protocol interface, converts input electrical enemy into electrical enemy conforming to a requirement of the external load, and provides the converted electrical energy to the outputting unit via the common conflux bus bar, wherein the monitoring unit is configured to:
acquire an intensity of each kind of electrical energy input by the inputting unit and a load current required by the external load of the outputting unit:
determine a kind or kinds of electrical energy that can provide the required load current in the at least two kinds of electrical enemy according to the intensity of each kind of electrical energy and the load current; and
determine at least one kind of electrical enemy from the electrical enemy that can provide the required load current, and the determined at least one kind of electrical enemy is allocated to the power converting unit by the allocating unit.

2. The communication power according to claim wherein the monitoring unit is further configured to:
acquire a pre-determined priority of each kind of electrical energy, and determine the at least one kind of electrical energy from the electrical energy that can provide the required load current according to the order of the priority.

3. The communication power according to claim 1, further comprising:
a storage battery connected with the outputting unit and configured to perform charging or discharging according to the control of the monitoring unit.

4. A control method for multi-energy-source supply, comprising:
receiving at least two kinds of electrical energy, and selecting at least one kind of electrical energy from the at least two kinds of electrical energy;
allocating the selected at least one kind of electrical energy to a power converting unit; and
performing, by the power converting unit, power conversion on the at least one kind of electrical energy, and then providing the converted electrical energy to an external load,
wherein the method further comprises the step, after the step of receiving at least two kinds of electrical energy, of performing signal conditioning respectively on each kind of electrical energy received according to a voltage-input range of the power converting unit, to conform to the voltage-input range of the power converting unit,
wherein the power converting unit consists of a plurality of general power converting sub-modules working in parallel connection outputting to a common conflux bus bar; each of the general power converting sub-modules has the same physical, electrical, signal, or software protocol interface, converts input electrical enemy into electrical enemy conforming to a requirement of the external load, and provides the converted electrical energy to the outputting unit via the common conflux bus bar,
wherein the selecting at least one kind of electrical energy from the at least two kinds of electrical enemy comprises:
acquiring an intensity of each kind of electrical energy and a load current required by the external load;
determining a kind or kinds of electrical enemy that can provide the required load current in the at least two kinds of electrical energy according to the intensity of each kind of electrical enemy and the load current; and
selecting at least one kind of electrical energy from the electrical energy that can provide the required load current.

5. The control method according to claim 4, wherein the selecting at least one kind of electrical energy from the electrical energy that can provide the required load current comprises:
acquiring a pre-determined priority of each kind of electrical energy, and selecting the at least one kind of electrical energy from the electrical energy that can provide the required load current according to the order of the priority.

* * * * *